United States Patent
Satran et al.

[11] Patent Number: 5,947,650
[45] Date of Patent: Sep. 7, 1999

[54] MILLING CUTTING INSERT

[75] Inventors: Amir Satran, Kfar Vradim; Rafael Margulis, Karmiel, both of Israel

[73] Assignee: Iscar Ltd., Midgal Tefen, Israel

[21] Appl. No.: 09/029,991
[22] PCT Filed: Sep. 17, 1996
[86] PCT No.: PCT/IL96/00112
  § 371 Date: Mar. 13, 1998
  § 102(e) Date: Mar. 13, 1998
[87] PCT Pub. No.: WO97/10916
  PCT Pub. Date: Mar. 27, 1997

[30] Foreign Application Priority Data

Sep. 18, 1995 [IL] Israel ......................................... 115338
Mar. 19, 1996 [IL] Israel ......................................... 117552

[51] Int. Cl.$^6$ .................................................. B23B 27/22
[52] U.S. Cl. ........................ 407/113; 407/114; 407/115; 407/116
[58] Field of Search ................................. 407/113, 114, 407/115, 116, 103, 101, 100, 104

[56] References Cited

U.S. PATENT DOCUMENTS

| | | | |
|---|---|---|---|
| 4,425,063 | 1/1984 | Striegl | 407/113 X |
| 5,207,538 | 5/1993 | Satran | 407/113 |
| 5,421,679 | 6/1995 | Pantzar et al. | 407/114 |
| 5,443,334 | 8/1995 | Pantzar | 407/114 X |
| 5,685,670 | 11/1997 | Satran | 407/113 X |
| 5,791,832 | 8/1998 | Yamayose | 407/113 |
| 5,800,100 | 9/1998 | Krenzer | 407/113 X |

FOREIGN PATENT DOCUMENTS

| | | |
|---|---|---|
| 0 156 780 A2 | 10/1985 | European Pat. Off. . |
| 0 156 780 B1 | 10/1985 | European Pat. Off. . |
| 0 269 103 A2 | 6/1988 | European Pat. Off. . |
| 0 358 623 A1 | 3/1990 | European Pat. Off. . |
| 0 358 623 B1 | 3/1990 | European Pat. Off. . |
| 92 00 612 | 3/1992 | Germany . |
| 92 00 612.4 | 3/1992 | Germany . |
| 62-24903 | 2/1987 | Japan . |

Primary Examiner—Andrea L. Pitts
Assistant Examiner—Henry W. H. Tsai
Attorney, Agent, or Firm—Pennie & Edmonds LLP

[57] ABSTRACT

A milling cutting insert including a substantially prismatic body portion having an upper surface, a lower surface, side surfaces and at least one protruding nose-like cutting corner, having a rake surface merging with the upper surface and a wraparound relief flank surface having portions merging respectively with adjacent side surface meeting at the cutting corner, front and side cutting edges formed by the intersection between the rake surface and the wraparound relief flank surface, the cutting edges protruding outwardly relative to their respective side surface surfaces and being elevated relative to the upper surface with at least the side cutting edge sloping towards the lower surface.

15 Claims, 16 Drawing Sheets

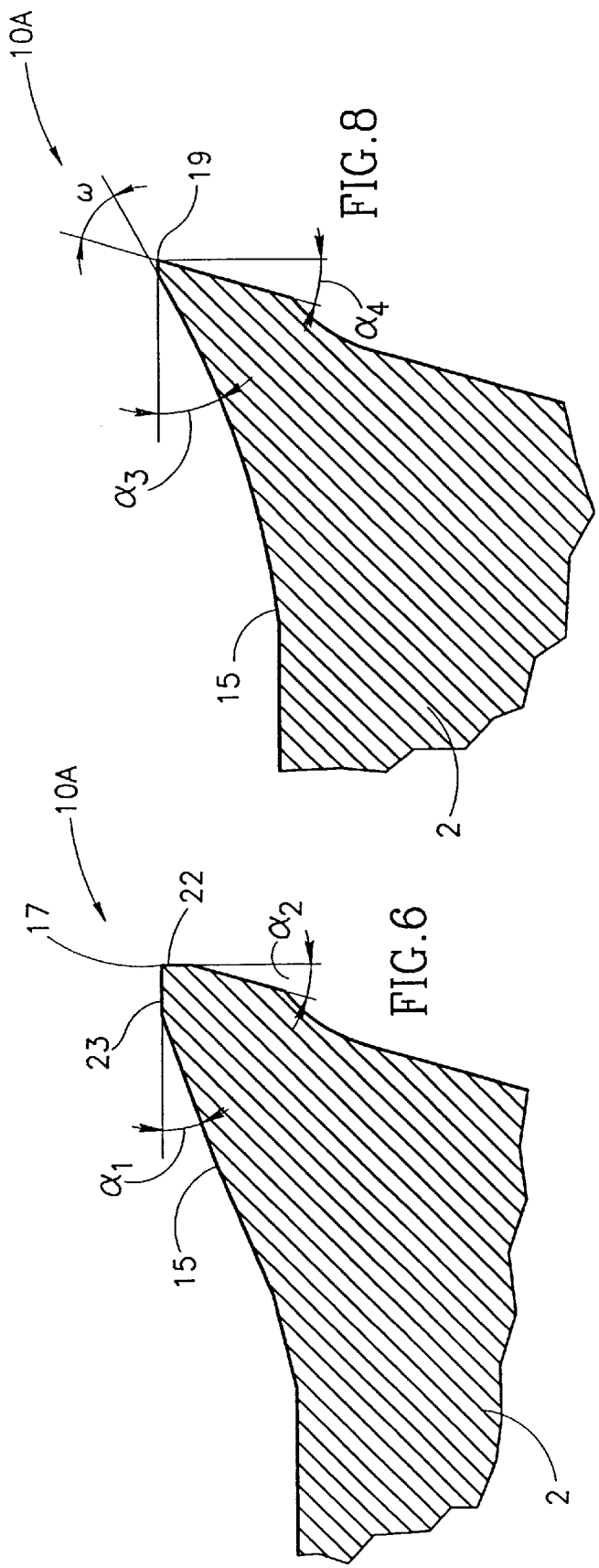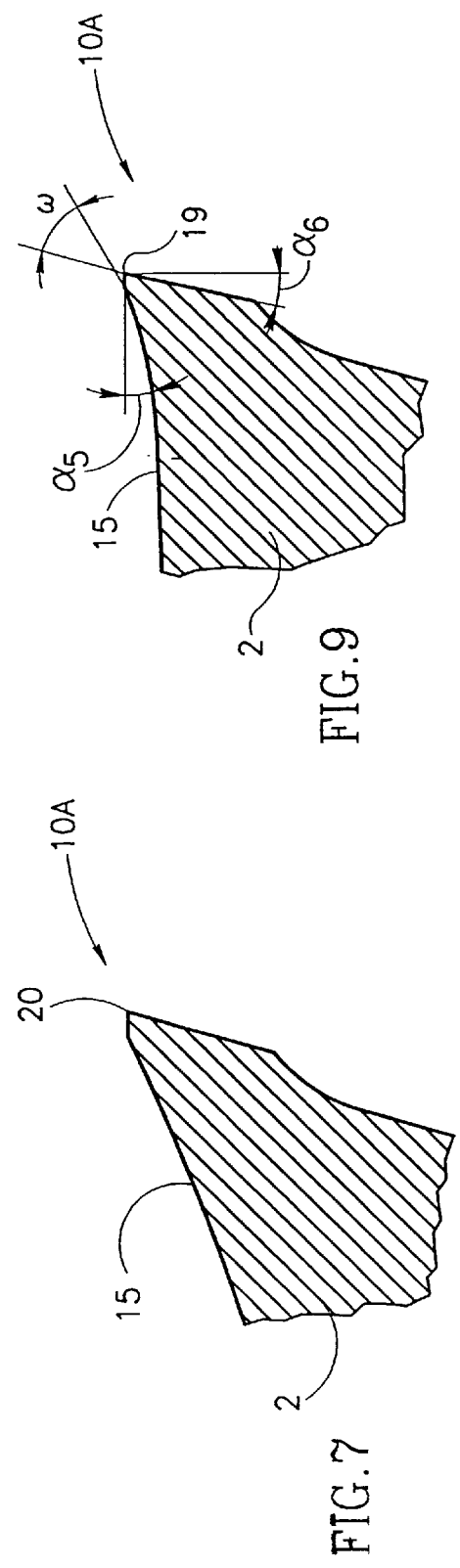

MILLING CUTTING INSERT

FIELD OF THE INVENTION

The present invention relates to cutting inserts for use in rotary machining operations- in general and, in particular, to milling cutting inserts for milling workpieces of different work material groups including soft "gummy" or light metal materials, for-example, aluminum.

BACKGROUND OF THE INVENTION

As used in the specification, for a cutting insert in hand, the term "rake surface angle" at a section passing through a point anywhere along one of its cutting edges is the angle between the cutting edge's associated rake surface and a plane parallel to the cutting insert's lower surface whilst the term "relief flank surface angle" at a section passing through a point anywhere along one of its cutting edges is the angle between cutting edge's relief flank and a plane normal to the cutting insert's lower surface.

Against this, for a cutting insert mounted in a milling toolholder, the term "radial rake angle" at a section passing through a point anywhere along a side cutting edge is the angle between its associated rake surface and a radius with respect to the milling cutter's rotary axis whilst the term "axial rake angle" at a section passing through a point anywhere along a front cutting edge is the angle between associated rake surface and a projection of the milling cutter's rotary axis onto that section.

And, in a similar manner, for a cutting insert mounted in a milling toolholder, the term "radial relief angle" at a section passing through a point anywhere along a side cutting edge is the angle between its associated relief flank and the tangent to the circular path generated by that point whilst the term "axial relief angle" at a section passing through a point anywhere along a front cutting edge is the angle between its associated relief flank and a plane perpendicular to the milling cutter's rotary axis.

A light metal workpiece is typically provided in a near net shape which requires a single pass of minimal depth-of-cut chip removing combined with finishing operation to arrive at its desired highly smooth final net shape. Such finishing is achieved by a milling cutter having and front cutting edges acting as wipers whose length are only slightly longer than the intended feed per revolution and, therefore, typically in the order of about 2–3 mm. In addition, for effective chip removal from light metal workpieces, a milling cutter is required to present, on the one hand, high shear axial and radial rake angles which are also useful for curling up cut chips which can then be readily evacuated during a high speed cutting operation and, on the other hand, high axial and radial relief angles. Typical values for radial and axial rake angles are about 20° while typical values for radial and axial relief angles are about 12°.

Up to the present time, the high axial and radial rake and relief angles required for machining light metal workpieces have been provided by a so-called double positive milling cutter, for example, as described in Applicant's U.S. Pat. No. 5,207,538 to Satran, in which cutting inserts are suitably axially inclined and radially disposed, the downside of which being a weakening of the milling toolholder and an increase in at least the milling cutter's axial runout due to tolerances of its insert receiving pockets. Thus, such milling cutters are unable to achieve highly smooth surfaces which are thereafter obtained by subsequent grinding operations.

EP 0 269 103 A3 describes a cutting insert for machining light metal workpieces having a square insert body with an upper surface and four symmetrical nose-like cutting corners. Each nose-like cutting corner has a pair of concave main cutting edges rising up from the upper surface and meeting at a chamfered corner cutting edge parallel and elevated relative to the upper surface. An operative corner cutting edge serves as a front cutting edge whilst one of its adjacent main cutting edges provides an entrance angle of 45° enabling fairly deep depth-of-cut 45° shouldering or finishing operations. Apart from the insert's limited applications, highly smooth finishing operations are hardly achievable due to the fact that its front cutting edges are not supported and precisely positioned by corresponding support surfaces oppositely disposed thereto for controlling axial runout. In addition, the cutting insert also suffers from the drawback that preparation of its cutting edges entails peripheral grinding of its entire side surfaces since the cutting edges do not-protrude from their respective side surfaces.

In this regard, JP Publication No. 62094903 A describes a compound cutting tool having a brazed-on, ultra hard sintered material, planar cutting corner with cutting edges protruding outwardly from the tool's respective side surfaces for the purpose of preventing dulling of a diamond grinding wheel by the tool's base metal during preparation of the corner's cutting edges.

It is an object of the present invention to provide a new millino cutting insert for machining workpieces of different work material groups and, in particular, of soft "gummy" or light metal materials.

SUMMARY OF THE INVENTION

In accordance with the teachings of the present invention, there is provided a milling cutting insert comprising a substantially prismatic body portion having an upper surface, a lower surface, side surfaces and at least one protruding nose-like cutting corner having a rake surface merging with said upper surface and a wraparound relief flank surface having portions merging respectively with adjacent side surfaces meeting at said cutting corner, front and side cutting edges formed by the intersection between said rake surface and said wraparound relief flank surface, said cutting edges protruding outwardly relative to their respective side surfaces and being elevated relative to said upper surface with at least said side cutting edge sloping towards said lower surface.

By virtue of this design, such a protruding nose-like cutting corner can be formed with high positive radial and axial rake surface and relief flank surface angles which impart the required high positive radial and axial rake and relief angles required for chip removal from soft "grummy" or light materials without the need for axial inclination of the insert. In a similar fashion, a protruding nose-like cutting corner can be formed with less positive radial and axial rake surface and relief flank surface angles which can impart the required radial and axial rake and relief angles required for different work material groups such as steels, stainless steels cast irons and the like.

The advantages provided therefore by such protruding nose-like cutting corners are multi-fold and include the effective separation between a cutting insert's cutting geometry and its abutment geometry which can then also be adapted for different toolholders and applications, thereby imparting an even broader freedom in the design of cutting inserts of the specified kind. In addition, by virtue of the protrusion of the front and side cutting edges relative to their respective side surfaces, their-localized grinding can be independently effected.

And finally, it provides for the simplification and strengthening of a milling toolholder which can be used with a wide variety of different cutting inserts each having at least one nose-like protruding cutting corner dedicated for different materials and applications.

A cutting corner may be of either an asymmetrical design or a symmetrical design which, in the latter case, provides for the advantage that a cutting insert can-be equally employable in both left hand and right hand milling toolholders.

In a preferred embodiment of a cutting insert having a cutting corner of an asymmetrical design, the cutting insert is of a substantially rectangular shape in a top view and, as such, is provided with a pair of diagonally opposite cutting corners. In such an embodiment, a front cutting edge is formed along each long side surface and a side cutting edge is formed along each short side surface so as to make a rightangle with its adjacent front cutting edge.

Still further, such a rectangular shaped cutting insert is preferably provided with a pair of spaced apart co-planar abutment surfaces along each of its long side surfaces and a single planar abutment surface along each of its short side surfaces which enable the precise positioning of a cutting insert in an insert receiving pocket suitably adapted therefor.

The front cutting edge of each cutting comer is parallel to the pair of co-planar abutment surfaces of the cutting insert's opposing long side surface such that it can be readily positioned parallel to a work surface for wiping off the same to a highly smooth finish. In addition, one of the abutment-surfaces of one long side surface is preferably located opposite the front cutting edge associated with its opposing long side surface and the other of the abutment surfaces is located adjacent to the cutting corner along the same long side surface so as to be remote as possible from the former abutment surface.

In a preferred embodiment of a cutting insert having a cutting comer of a symmetrical design, the cutting insert is of a substantially square shape in a top view and, as such, is provided with four cutting comers. To take into consideration the fact that the function of a symmetrical cutting corner's cutting edges as front and side cutting edges is dependent on the hand of a milling toolholder in which a cutting insert is to be mounted, a symmetrical cutting corner's cutting edges are hereinafter referred to as right and left cutting edges respective to a bisector symmetry plane extending radially from the cutting insert's axis of symmetry to a comer cutting edge interdisposed between its adjacent right and left cutting edges.

As hitherto explained, it is known that a front cutting edge typically has a length of about 2–3 mm for effective operation when performing a wiping function. Whilst, at the same time, it is often the case that a required cutting depth may be of greater depth of, say, about 4 mm. To overcome these conflicting requirements in the case of a symmetrical cutting comer, the right and left cutting edges are each constituted by a first cutting edge component adjacent to its comer cutting edge and a second cutting edge component remote from its comer cutting edge wherein the first cutting edge components are angularly disposed to one another at an included angle slightly greater than 90° and the second cutting edge components are inclined relative to their respective adjacent first cutting edge components at an included angle of slightly less than 180°.

On suitable angular mounting of such a cutting insert in an insert receiving pocket adapted therefor, this design of a symmetrical cutting corner enables that only a first cutting edge component of one of the right and left cutting edges is positioned as a front cutting edge whilst both components of the other cutting edge of the same cutting corner merge to provide a cutting depth equal to their combined length and longer than its adjacent front cutting edge. As such, the first cutting edge components of a cutting corner have a length restricted in accordance with their potential function as a front cutting edge, namely, 2–3 mm.

In contrast to the rectangular shaped cutting insert, each side surface of the square shaped cutting insert is provided with a pair of spaced apart co-planar abutment surfaces by virtue of which the right or left cutting edges of each cutting corner can be positioned parallel to a work surface for wiping off the same to a highly smooth finish.

In both asymmetrical and symmetrical designs of a cutting corner, the abutment surfaces of the cutting insert can be either perpendicular or inclined with respect to its lower surface. In the former case, the provision of abutment surfaces along the long side surfaces and the short side surfaces which are perpendicular to the lower surface provides for a square box-like construction, thereby further contributing to the precise positioning of a cutting insert within an insert receiving pocket suitably adapted therefor.

The different embodiments of cutting inserts as described hereinabove can be manufactured by means of conventional hard-metal powder compacting and sintering technology. Such techniques also include the possibility of manufacturing exchangeable cutting inserts with chip forming surfaces of compound blended surfaces and micro-chip forming means. The cutting inserts can also be subjected to finishing treatments, for example, grinding particular portions of the cutting edges so as to form narrow lands for strengthening the same and the application of hard material surface coatings.

Rather than the cutting inserts of the present invention being integrally formed with protruding nose-like cutting corers, they can be formed from an insert body and one or more cutting corners at least partially prepared as discrete structures from superhard cutting material wafers for bonding to an insert body by, for example, brazing methods. In such a case, the discrete structures would typically include the portion of a cutting corner which is elevated above the upper surface of a single-body cutting insert. Typical superhard cutting materials include, but are not limited to, polycrystalline diamond, cubic boron nitride, natural diamond and the like.

BRIEF DESCRIPTION OF THE DRAWINGS

For a better understanding of the present invention and to show how the same can be carried out in practice by way of non-limiting examples, reference will now be made to the accompanying drawings, in which:

FIG. 6 is a partial cross-sectional view taken along the line VI—VI in FIG. 2;

FIG. 7 is a partial cross-sectional view taken along the line VII—VII in FIG. 2;

FIG. 8 is a partial cross-sectional view taken along the line VIII—VIII in FIG. 2;

FIG. 9 is a partial cross-sectional view taken along the line IX—IX in FIG. 2;

DETAILED DESCRIPTION OF THE DRAWINGS

Figure 1:
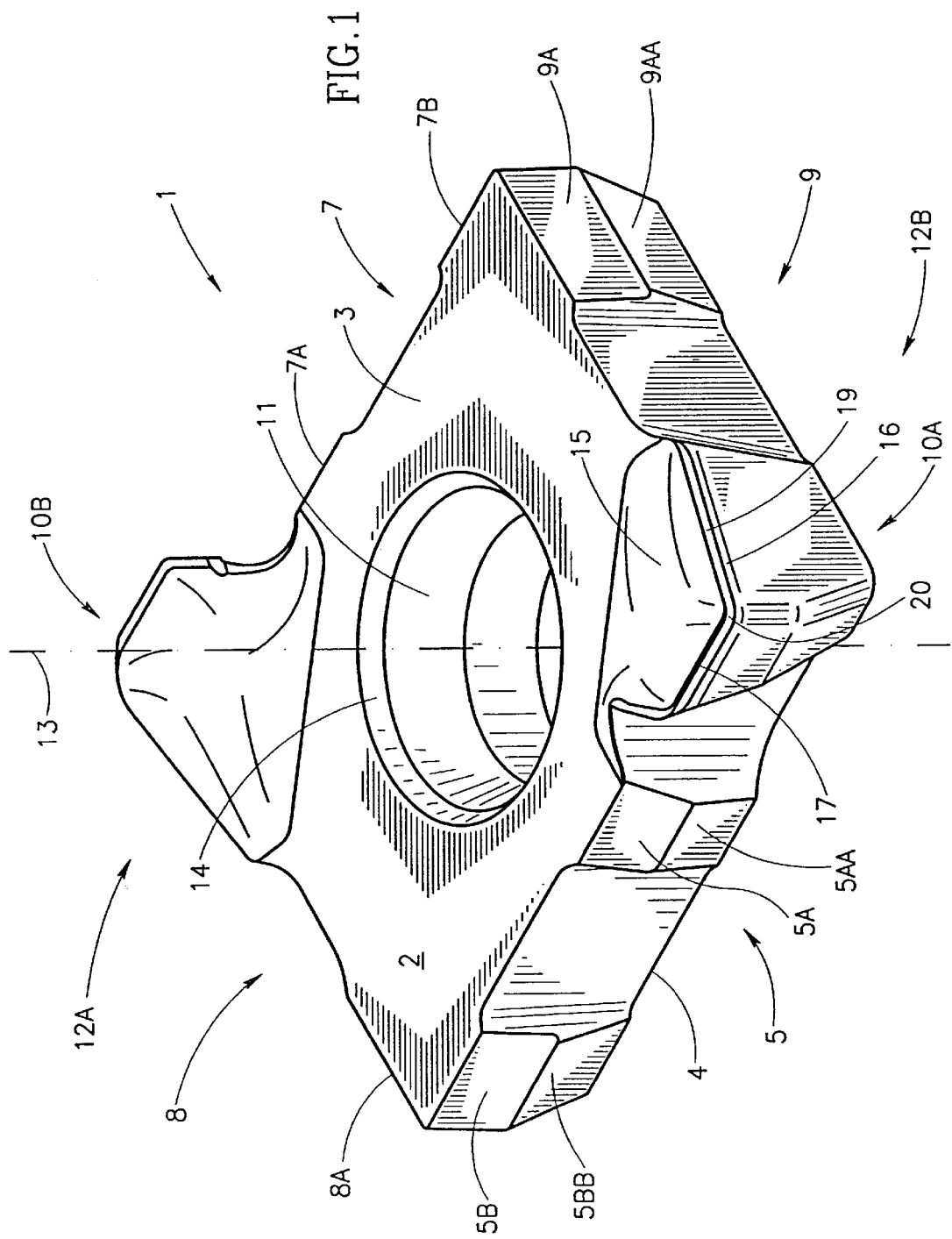
FIG. 1 is an isometric view of a rectangular shaped milling cutting insert in accordance with a first preferred embodiment of the present invention.

FIGS. 1–4 show a milling cutting insert, generally designated 1, having a substantially prismatic body 2 of a substantially rectangular basic shape in a top view and having an upper surface 3, a lower surface 4, long side surfaces 5 and 7 and short side surfaces 8 and 9. The long side surface 5 and the short side surface 9 meet at a protruding nose-like cutting corner 10A whilst the long side surface 7 and the short side surface 8 meet at a protruding nose-like cutting corner 10B diagonally opposite to the cutting corner 10A.

The cutting insert 1 has an axis of symmetry 13 about which it displays half-turn symmetry and, therefore, the details of its construction are described hereinbelow with reference to the long side surface 5, the short side surface 9 and the cutting corner 10A, it being understood that the details equally apply to the long side surface 7, the short side surface 8 and the cutting corner 10B, respectively.

As shown, the insert body 2 is preferably provided with a cylindrical fixation hole 11 disposed such that its axis is coincident with the axis of symmetry 13. The fixation hole 11 is provided with a countersink 14 preferably shaped as a part of a torus or a cone to receive a countersunk head screw or any other fixing element, such as a pinlock, for exchangeably retaining the cutting insert 1 in an insert receiving pocket of a milling toolholder.

The cutting corner 10A has a compound chip cutting rake surface 15 which, on the one hand, merges with the upper surface 3 and, on the other hand, intersects with a wraparound relief flank 16 so as to form a front cutting edge 17 and a side cutting edge 19 transversely disposed thereto via a corner cutting edge 20. The wraparound relief flank 16 is constituted by planes which merge with adjacent portions of the side surfaces 5 and 9 meeting at the cutting corner 10A whilst the compound chip cutting rake surface 15 is constituted by blended surfaces containing planar portions.

Figure 2:
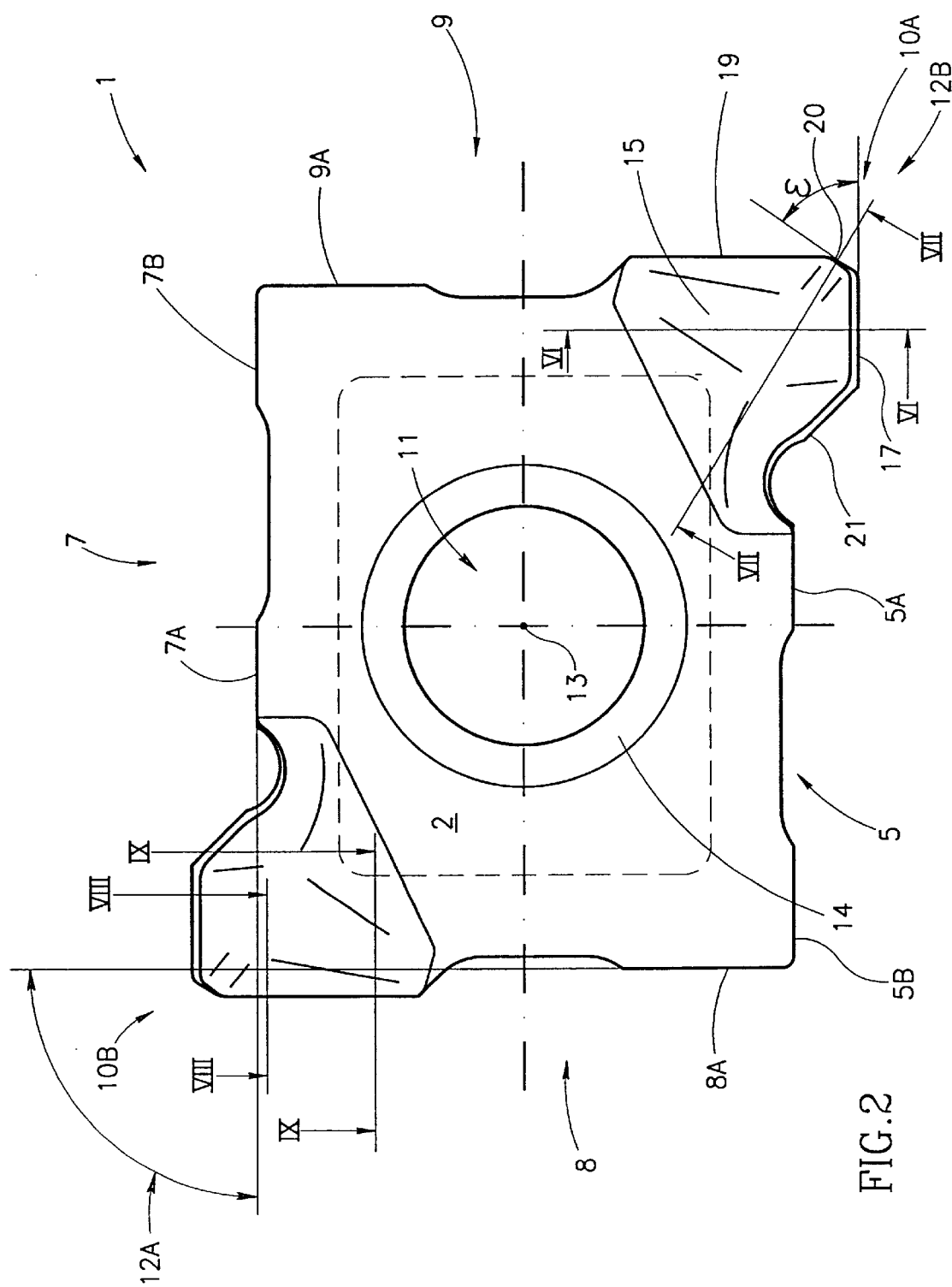
FIG. 2 is a top view of the cutting insert of FIG. 1.
Figure 3:
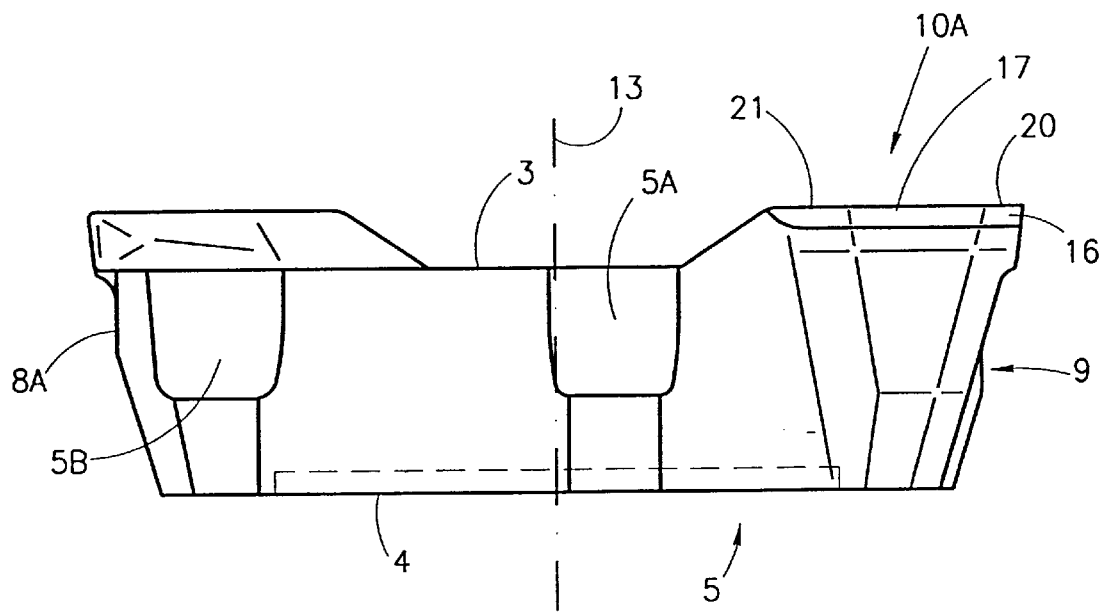
FIG. 3 is a front view of the cutting insert of FIG. 1.
Figure 4:
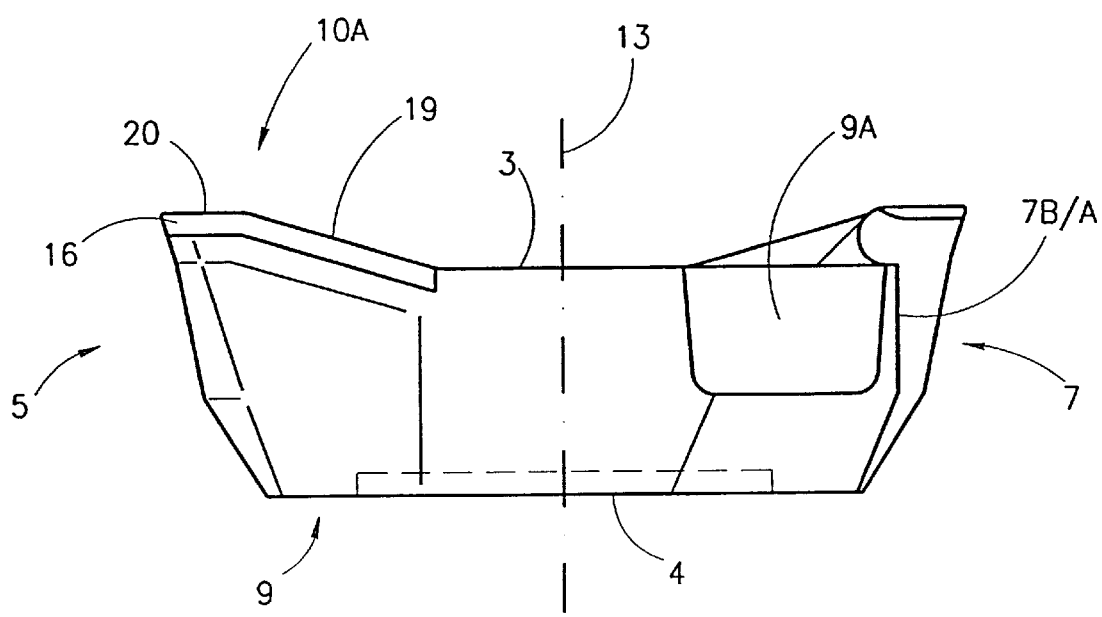
FIG. 4 is a side view of the cutting insert of FIG. 1.

As best seen in FIG. 2, the front cutting edge 17 and the side cutting edge 19 and their associated relief flanks protrude relative to the side surfaces 5 and 9, respectively. As seen in FIGS. 3 and 4, the cutting edges 17, 19 and 20 are elevated relative to the upper surface 3. In particular, as seen in FIG. 3, the front cutting edge 17 extends substantially parallel to the lower surface 4 whilst, as seen in FIG. 4, the side cutting edge 19 slopes from the cutting corner 20 towards the lower surface 4.

Figure 5:
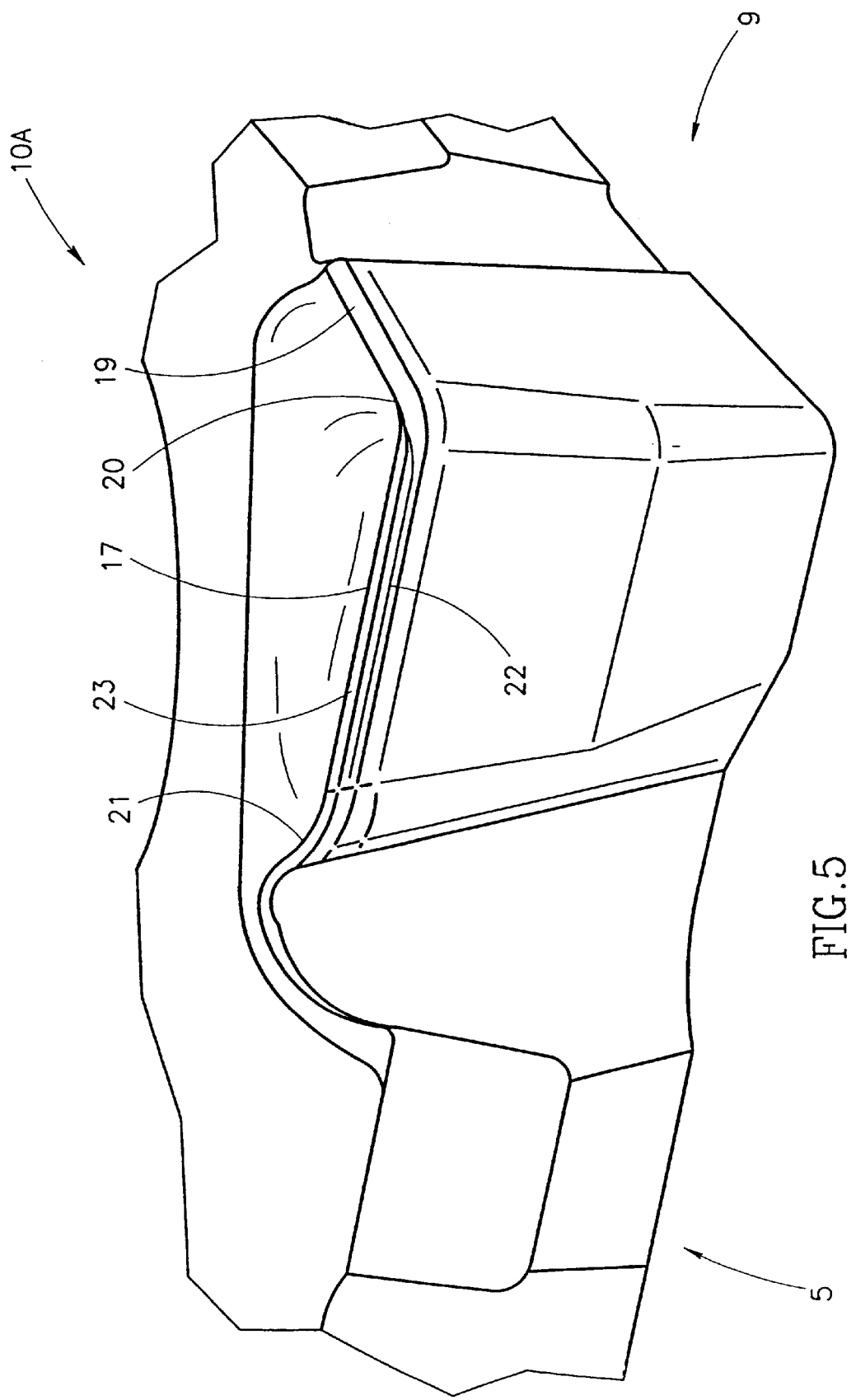
FIG. 5 is an isometric close-up view of a protruding nose-like cutting corner of the cutting insert of FIG. 1.

As best seen in FIGS. 2 and 3, the front cutting edge 17 merges with the top edge of the side surface 5 via an inner cutting edge 21 provided so as to enable the cutting insert 1 to be plungable into a workpiece up to a depth slightly less than the protrusion of the front cutting edge 17 relative to the long side surface 5. The front cutting edge 17 can be provided with a narrow ground land 22 (see FIGS. 5 and 6) co-extensive therewith for improving surface finishing whilst it can be strengthened by the provision of a-rake land 23 having a substantially equal width therealong.

As best seen in FIGS. 6–9, the rake surface components of the compound chip cutting rake surface 15 associated with the front, side and corner cutting edges 17, 19 and 20 are concave imparting, as shown in FIG. 6, a positive rake surface angle $\alpha_1$ and a positive relief flank surface angle $\alpha_2$ and, as shown in FIGS. 8 and 9, positive rake surface angles $\alpha_3$ and $\alpha_5$ and positive relief flank surface angles $\alpha_4$ and $\alpha_6$. In addition, FIGS. 8 and 9 show that the cutting corner 10A is prepared such that it has a substantially invariant wedge angle $\omega$ along its side cutting edge 19.

As also shown in FIG. 2, the corner cutting edge 20 is preferably partly chamfered instead of being formed as a more usual nose radius so as to present an entrance angle $\epsilon$ of 60°, thereby avoiding the burring of a margin of a workpiece during a gradual leaving out therefrom. During finishing operations on a near net shape workpiece, the chamfered corner cutting edge 20 acts, in effect, as the side cutting edge of the cutting insert.

The cutting insert 1 is particularly adapted to be mounted in an insert receiving pocket of a milling toolholder particularly adapted for performing high speed finishing operations on light metal workpieces as described in Applicant's co-pending Israel Patent Application No. 115338 incorporated herein by reference. For this purpose, as best seen in FIG. 2, for an operative front cutting edge 17, a pair of spaced apart, co-planar abutment surfaces 7A and 7B are formed along the long side surface 7 and a single planar abutment surface 8A is formed along the short side surface 8. The abutment surfaces 7A, 7B and 8A are disposed so as to be perpendicular to the lower surface 4, thereby presenting a square box-like construction denoted 12A for accurate positioning of the cutting insert 1 relative to a milling cutter's axis of rotation. The provision of the square box-like construction also enables the accurate grinding of the front cutting edge 17 and the narrow ground land 22, thereby facilitating their intended operation.

Figure 10:
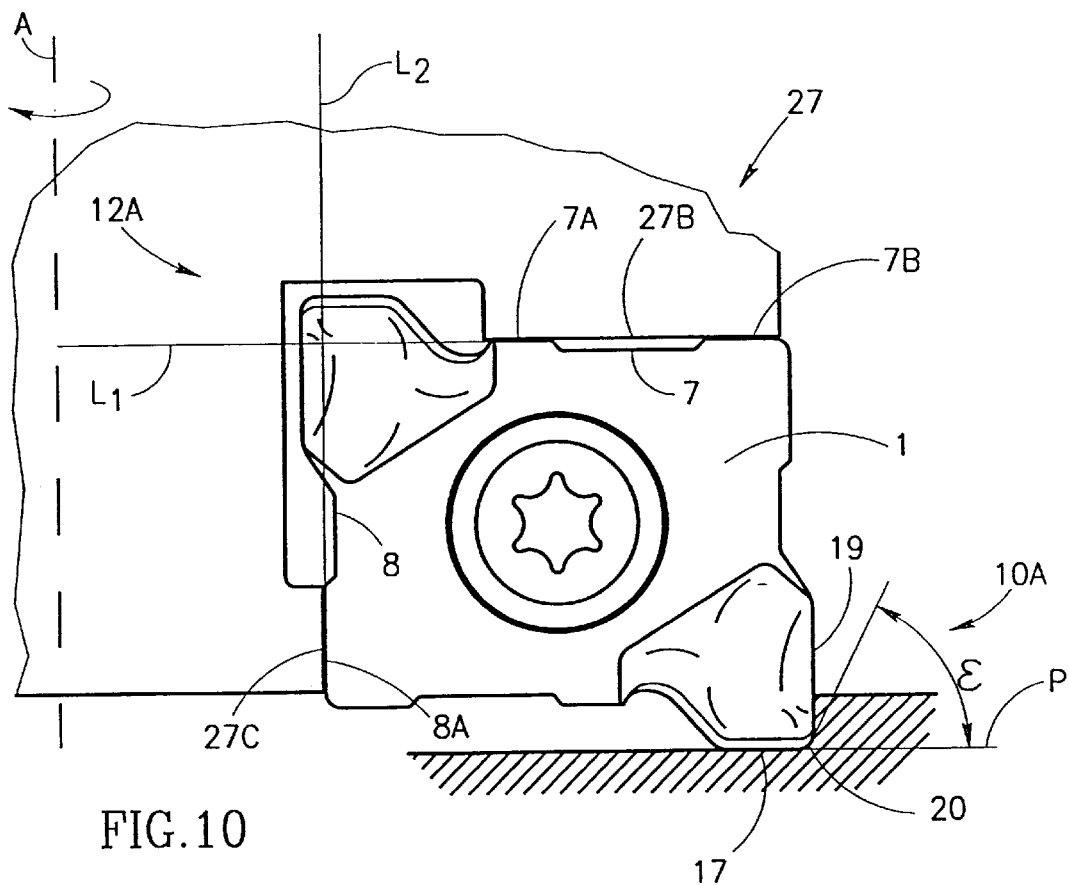
FIG. 10 is a schematic top view of the cutting insert of FIG. 1 seated in an insert receiving pocket of a right hand milling toolholder adapted therefor.
Figure 11:
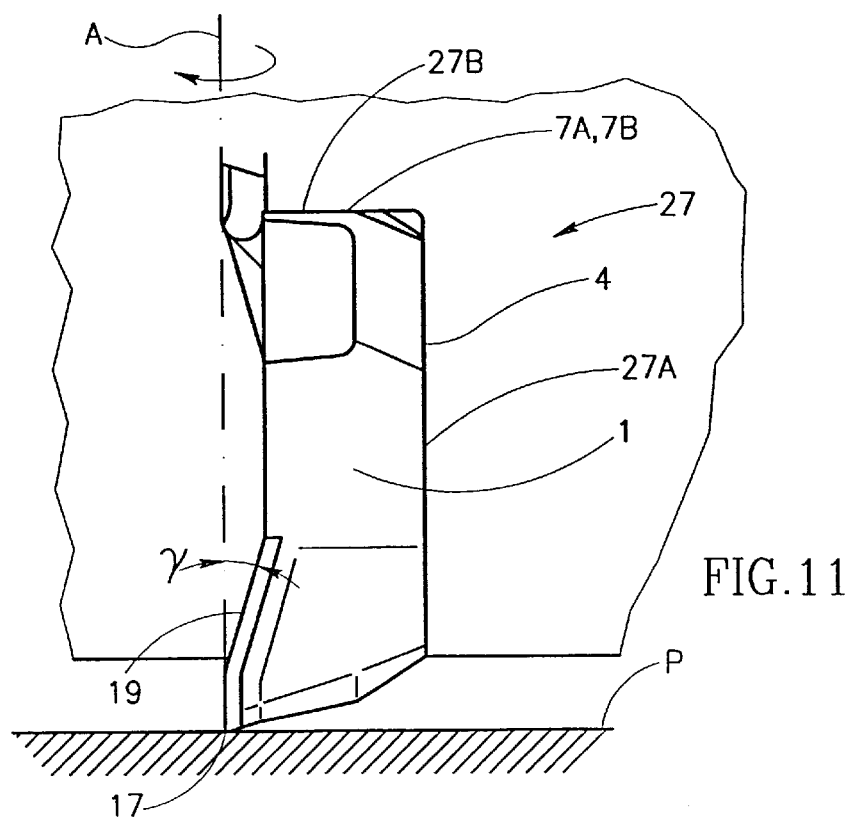
FIG. 11 is a schematic side view of the cutting insert of FIG. 1 seated in an insert receiving pocket of a right hand milling toolholder adapted therefor.
Figure 12:
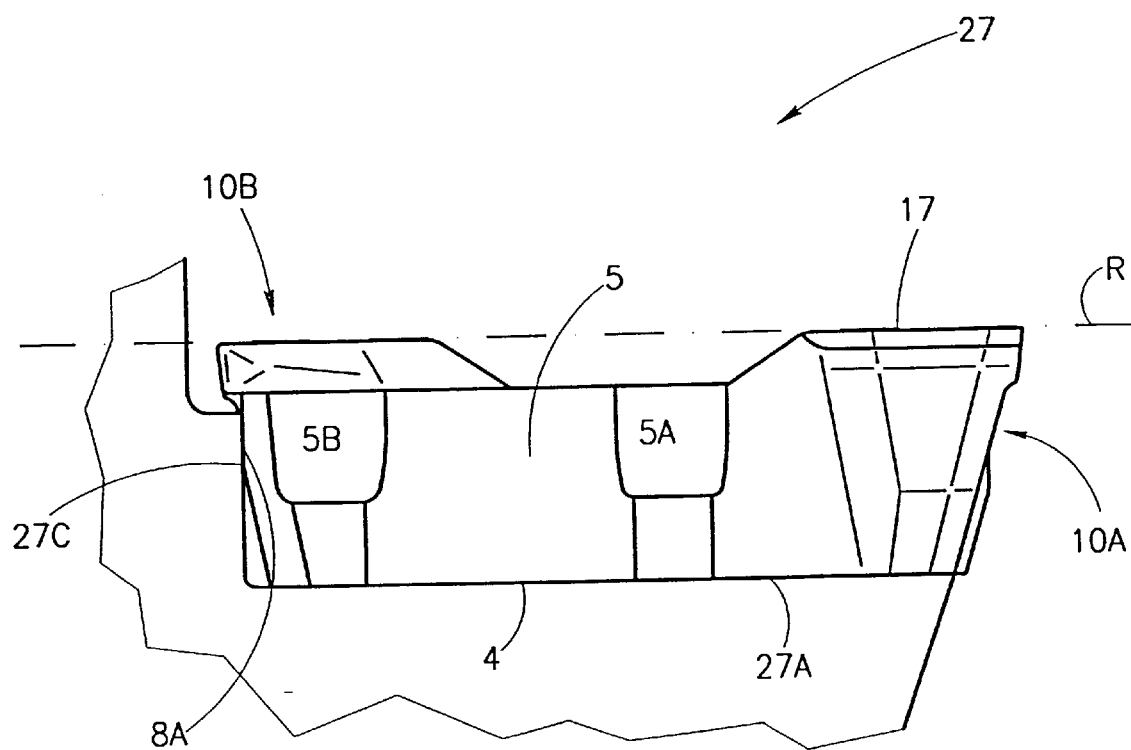
FIG. 12 is a schematic front view of the cutting insert of FIG. 1 seated in an insert receiving pocket of a right hand milling toolholder adapted therefor.
Figure 13:
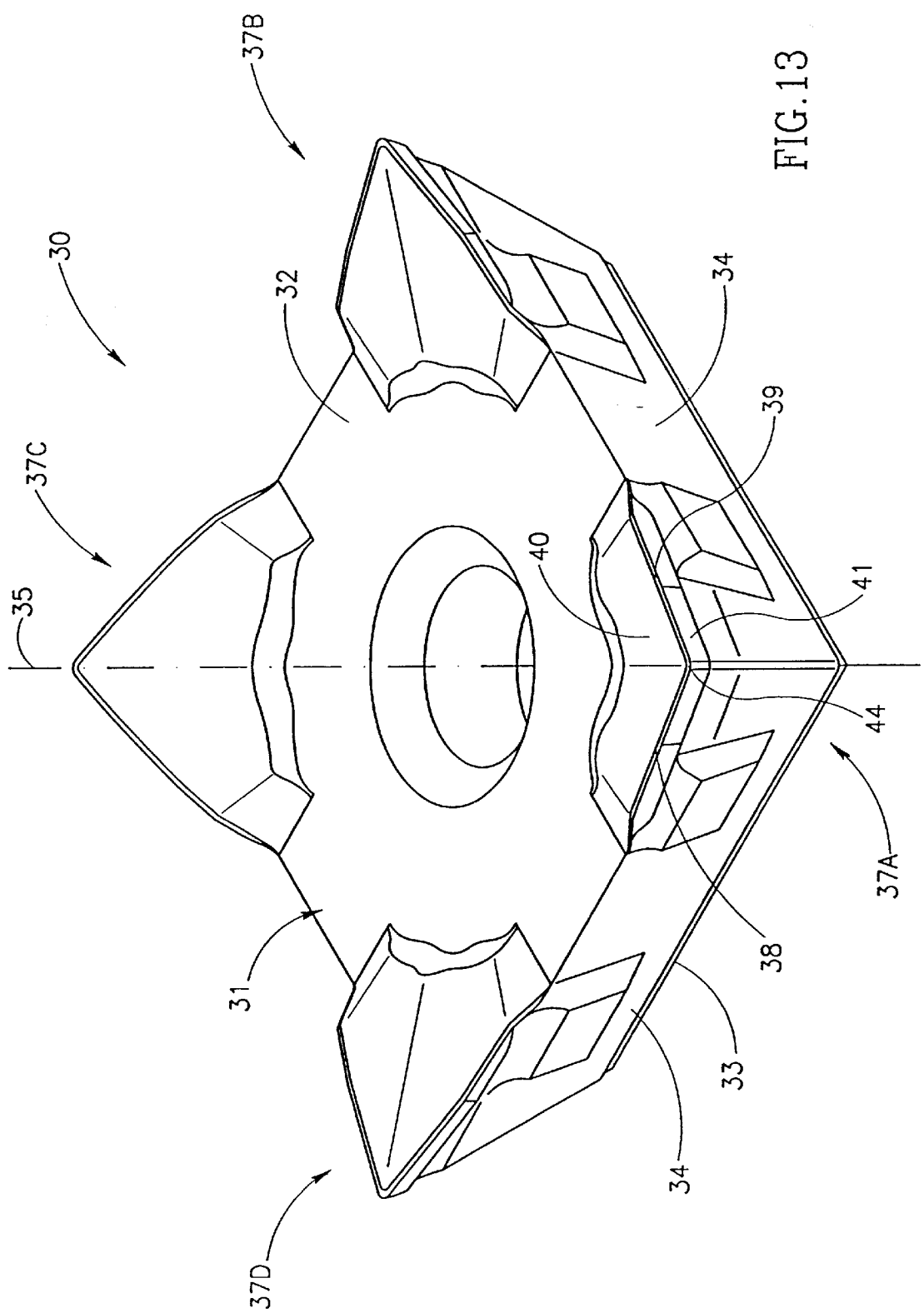
FIG. 13 is an isometric view of a square shaped milling cutting insert in accordance with a second preferred embodiment of the present invention.
Figure 14:
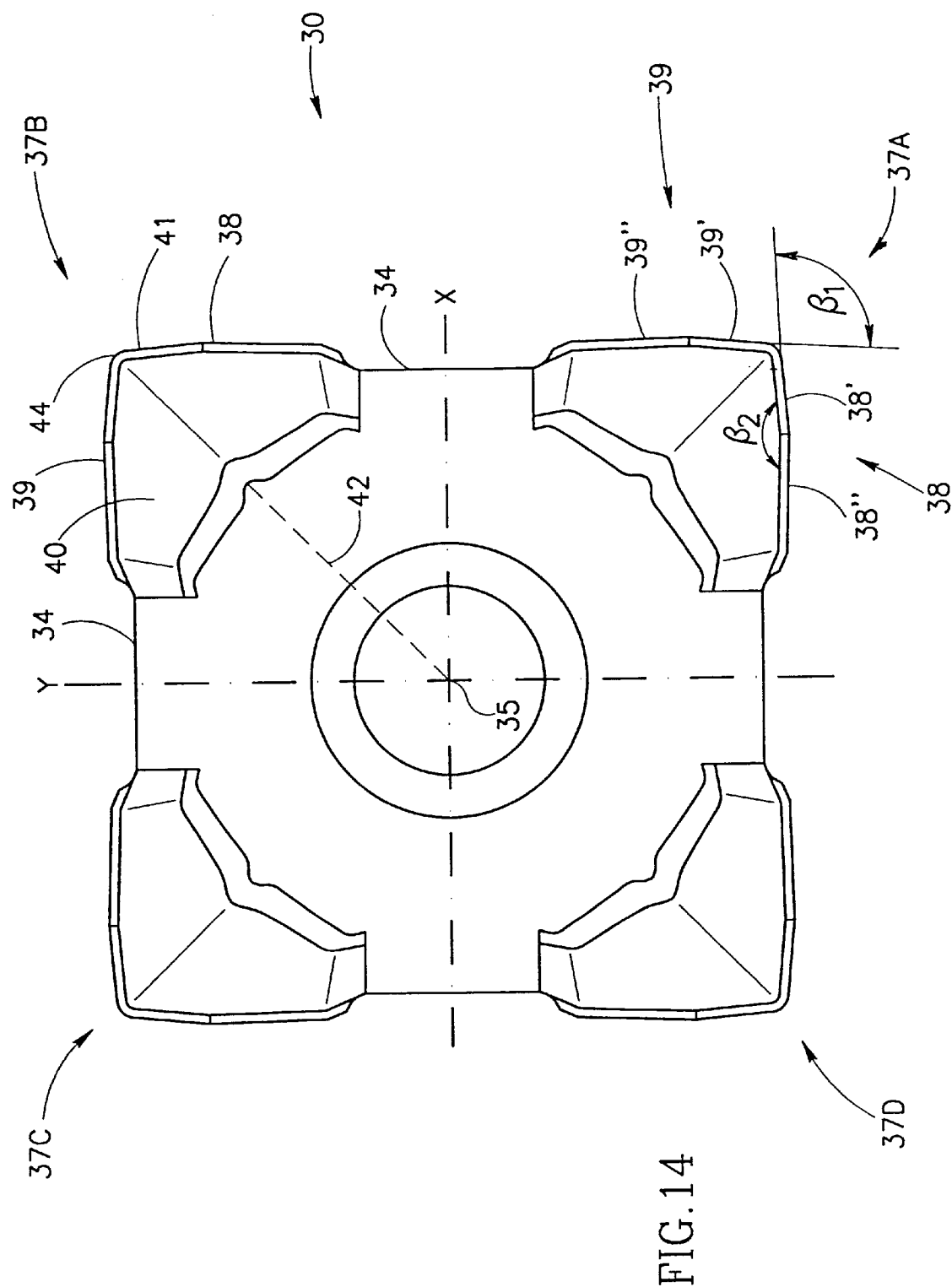
FIGS. 14 and 15 are respectively top and side views of the cutting insert of FIG. 13.
Figure 15:
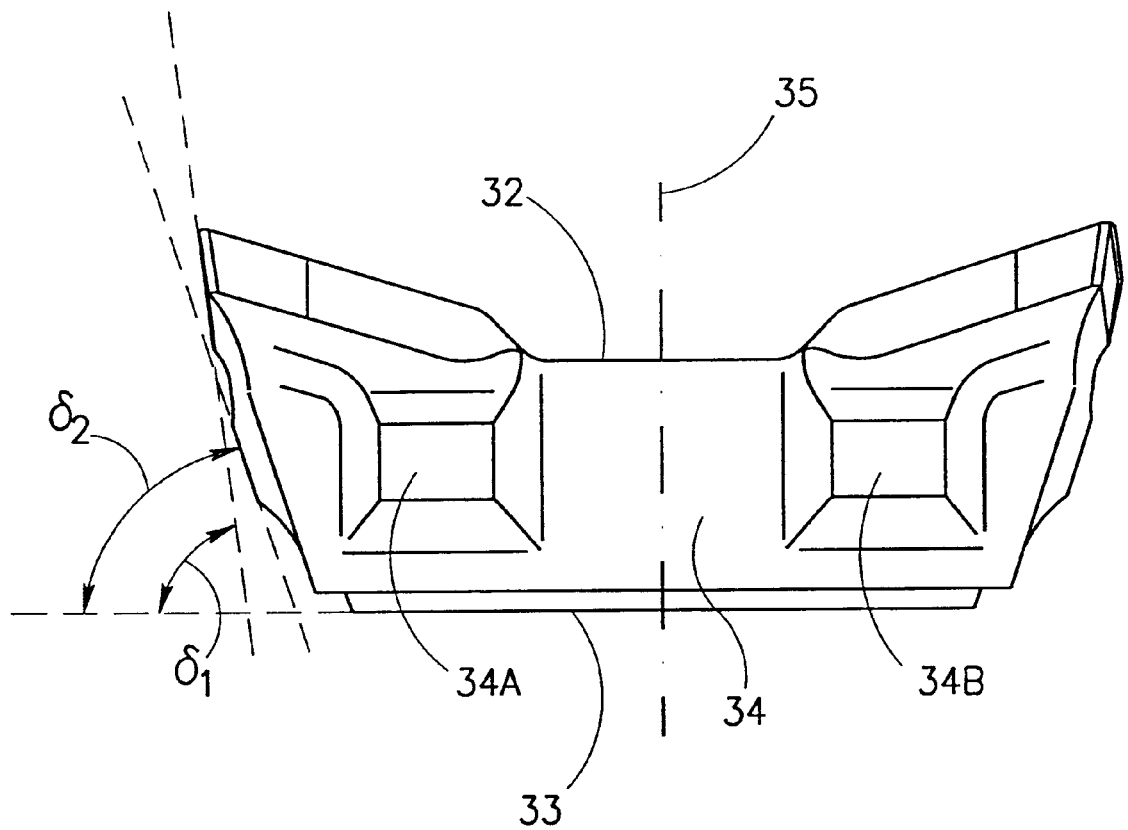
Figure 16:
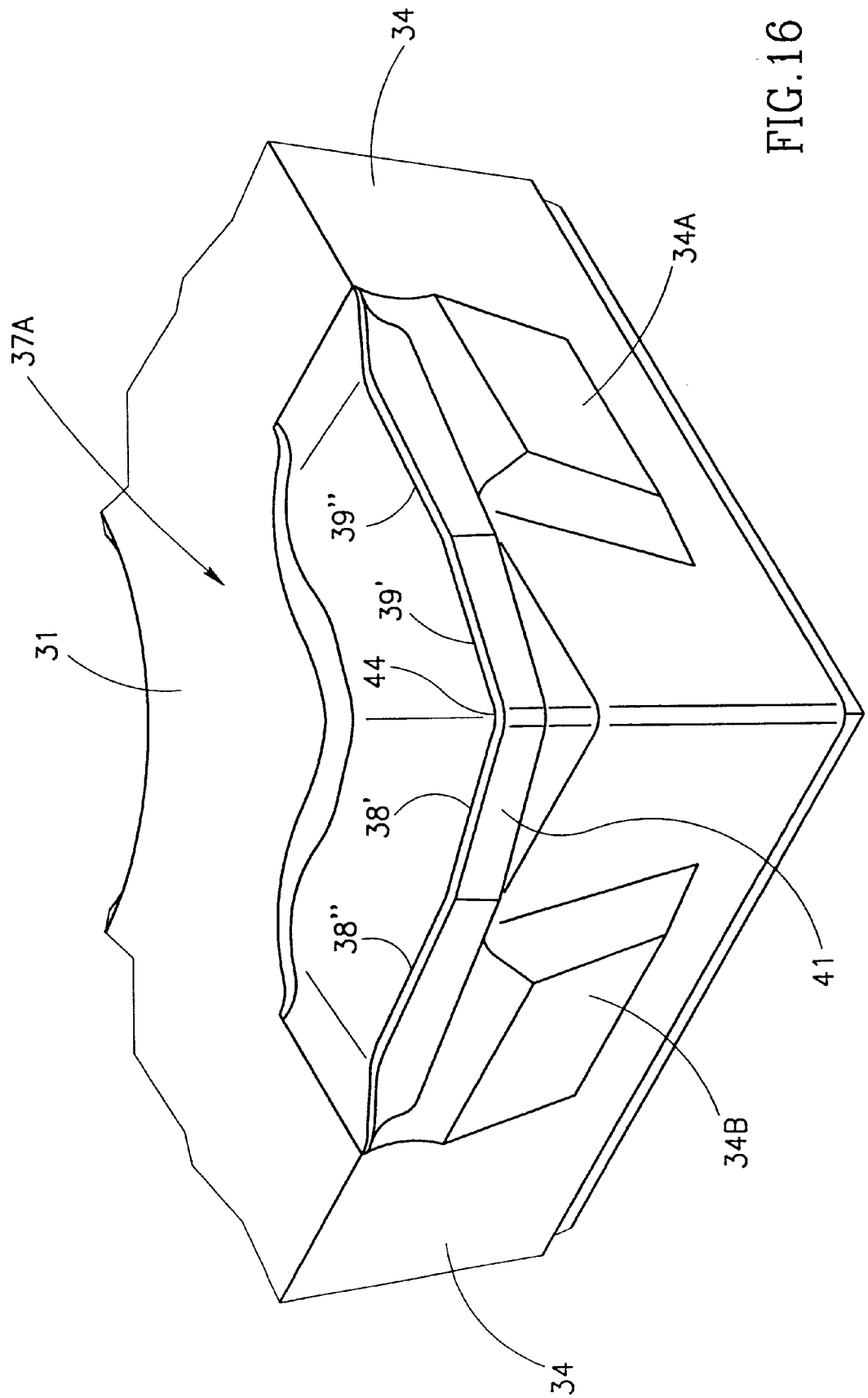
FIG. 16 is an isometric close-up view of a protruding cutting corner of the cutting insert of FIG. 13.

For the purpose of illustrating the mounting of a milling cutting insert 1 in an insert receiving pocket 27 of such a milling toolholder having an axis of rotation A, reference is now made to FIGS. 10–12 which show the use of its box-like construction 12A to position an operative cutting corner 10A having its front cutting edge 17 disposed on a radius R forming part of a radial plane P perpendicular to the axis of rotation A. As such, the insert receiving pocket 27 presents a planar base support surface 27A disposed parallel to the axis of rotation A and against which the lower surface 4 is adapted to bear for taking up tangential thrust. In addition, the insert receiving pocket 27 presents a radially deployed, planar axial support surface 27B which is perpendicular to both the axis of rotation A and the base support surface 27A and against which the pair of abutment surfaces 7A and 7B are designed to bear for taking up axial thrust at two spaced apart contact regions defining an imaginary line $L_1$ perpendicular to the axis of rotation A (see FIG. 10). And finally, the insert receiving pocket 27 presents an axially deployed, planar radial support surface 27C which is parallel to the axis of rotation A and perpendicular to the base support surface 27A and against which the abutment surface 8A is designed to bear for taking up radial thrust at a contact region defining an imaginary line $L_2$ perpendicular to the imaginary line $L_1$ (see FIG. 10).

Such positioning provides for minimal axial runout of a milling cutter fitted with two or more cutting inserts such that their operative front cutting edges 17, together with their associated narrow ground lands 22, can wipe out a produced plane of a workpiece to a highly smooth finish. In addition, such a cutter's operative front cutting edges 17 protrude beyond their associated exposed lower abutment surfaces 5A and 5B so as to ensure that the milling cutter is axially plungable into a workpiece a sufficient depth for machining a near net shape workpiece without abrasion of the abutment surfaces 5A and 5B by chips formed during a milling operation. At the same time, the operative side cutting edges 19 sufficiently protrude beyond their associated exposed abutment surfaces 9A such that transverse movement of the milling cutter during a milling operation is not restricted. Finally, notwithstanding that the cutting inserts 1 are not inclined, the operative cutting comers 10A present the required high positive axial and radial rake and relief angles so as to facilitate chip formation and removal from a light material workpiece, the high positive axial and radial rake and relief angles being identical to the axial and radial rake surface and relief flank surface angles of the insert.

FIGS. 13–16 show a milling cutting insert, generally designated 30, similar in design to the cutting insert 1 in the sense that it too has protruding nose-like cutting comers. The main difference between the former and that latter resides in that the cutting insert 30 has a square shaped insert body 31 in a top view which displays quarter-turn symmetry about an axis of symmetry 35. As such, the insert body 31 has an upper surface 32, a lower surface 33 and four side surfaces 34 meeting at identical protruding nose-like cutting corners 37A, 37B, 37C and 37D.

The main difference between a cutting corner 37 and a cutting comer 10 resides in that the former is symmetrical about a bisector symmetry plane 42 extending radially from the axis of symmetry 35 to a corner cutting edge 44 between identical left and right cutting edges 38 and 39, respectively, formed at the intersection between a compound chip cutting rake surface 40 and a wraparound relief flank 41, this symmetry enabling the cutting insert 30 to be equally mountable in both left hand and right hand milling toolholders.

In order to provide a front cutting edge limited to about 2–3 mm and a longer side cutting edge of, say, 4 mm, the cutting edges 38 and 39 are constituted by respective first cutting edge components 38' and 39' adjacent to the corner cutting edge 44 which are angularly disposed to one another at a slightly greater than rightangle $\beta_1$ of about 93° (shown in an exaggerated fashion in FIG. 14) and second cutting edge components 38" and 39" which define an included angle $\beta_2$ of slightly less than 180° relative to their adjacent first cutting edge components 38' and 39', respectively.

The cutting insert 30 is also similar to the cutting insert 1 in the sense that each operative front cutting edge 38' (or 39') is supported by a pair of spaced apart co-planar abutment surfaces adapted to bear against corresponding support surfaces of an insert receiving pocket whilst each operative side cutting edge is supported by a planar abutment surface adapted to bear against a corresponding support surface of an insert receiving pocket. However, in this case, due to the fact that the cutting insert 30 is four times indexable, each of its side surfaces 34 is formed with a pair of abutment surfaces 34A and 34B.

The abutment surfaces 34A and 34B may be designed so as to be similar to the abutment surfaces of the cutting insert 1. However, in the preferred embodiment, the abutment surfaces 34A and 34B of each side surface 34 are inclined at an acute angle $\delta_2$ relative to an imaginary extension of the lower surface 33 and are disposed inward relative to their adjacent cutting comers 37 whilst the wraparound relief flank 41 is inclined at an acute angle $\delta_1$ relative to the same imaginary extension. As shown, by virtue of the acute angle $\delta_1$ being greater than the acute angle $\delta_2$ and the relative disposition between the wraparound relief flank 41 and the abutment surfaces 34A and 34B adjacent to a cutting comer 37, this arrangement enables through-grinding of both without interference. In practice, the abutment surfaces 34A and 34B are ground first and then the wraparound relief flanks 41 are ground so as to ensure their accuracy relative to their positioning means.

Figure 17:
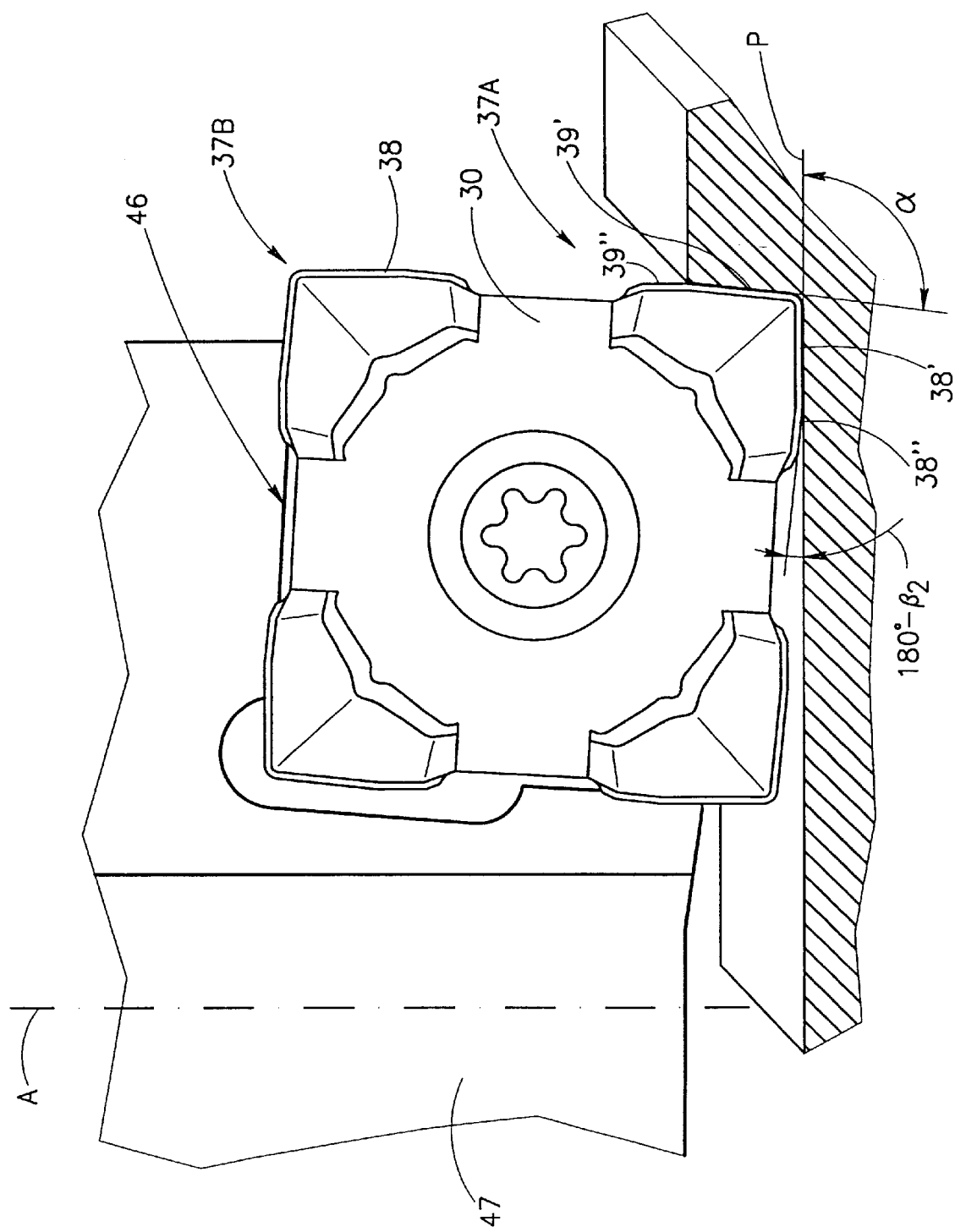
FIG. 17 is a top view of the cutting insert of FIG. 13 seated in an insert receiving pocket of a right hand milling toolholder adapted therefor.
Figure 18:
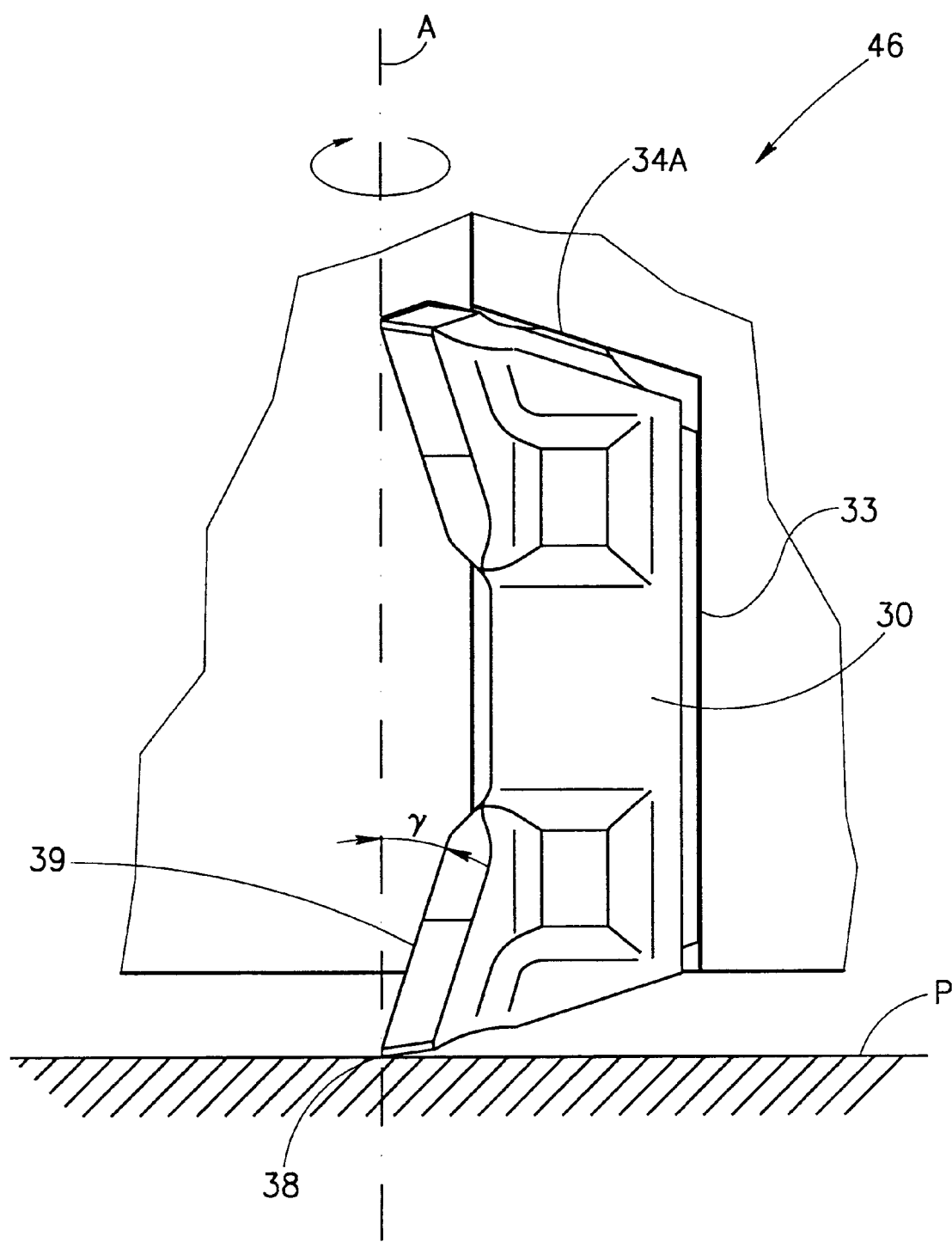
FIG. 18 is a side view of the cutting insert of FIG. 13 seated in an insert receiving pocket of a right hand milling toolholder adapted therefor.
Figure 19:
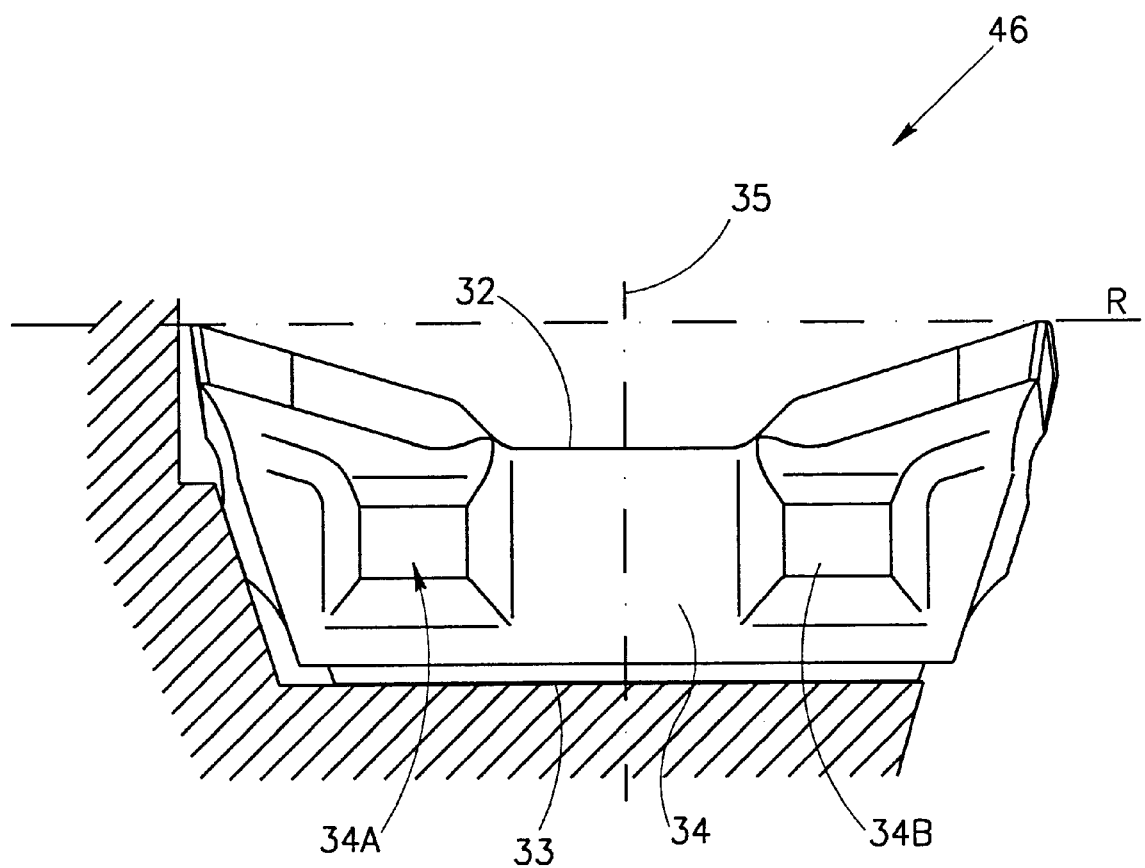
FIG. 19 is a front view of the cutting insert of FIG. 13 seated in an insert receiving pocket of a right hand milling toolholder adapted therefor.

For the purpose of illustrating the mounting of a cutting insert 30 mounted in an insert receiving pocket 46 adapted therefor of a right hand milling toolholder for the milling of a relatively shallow, near right angle shoulder, reference is now made to FIGS. 17–19. As shown, the insert receiving pocket 46 is adapted to angularly mount the cutting insert 30 such that the first cutting edge component 38' of the cutting comer 37A, lies in the radial plane P perpendicular to the milling cutter's axis of rotation A for functioning as a front cutting edge for wiping out a work surface. As can be clearly seen, the angular mounting of the cutting insert 30 together with the inclination of the second cutting edge component 38" relative to its adjacent first cutting edge component 38' ensures that the cutting edge component 38" is cleared away from the work surface by an upward inclined, so-called dish angle of 180°-$\beta_2$°. As shown in FIGS. 17 and 18, the cutting edge components 39' and 39" merge so as to present a single cutting edge 39 subtending a highly positive axial rake angle γ at the side cutting edge 39 for gradual entering and leaving of a workpiece.

Figure 20:
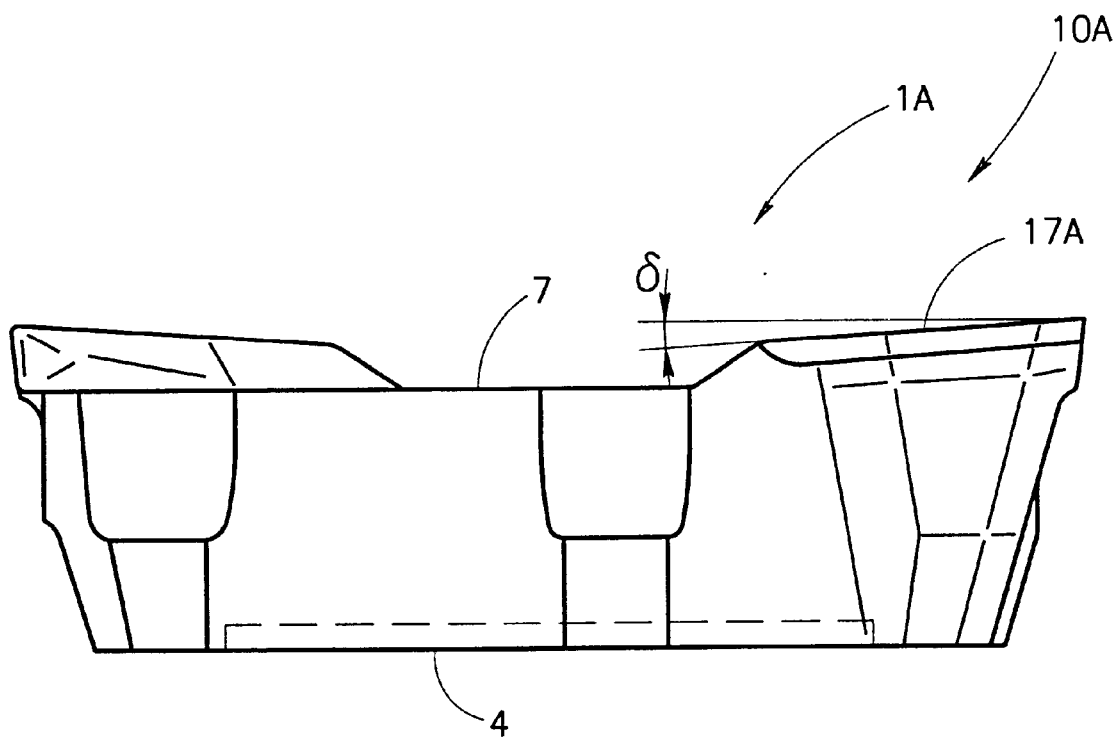
FIG. 20 is a front view of an-alternative rectangular shaped cutting insert having a front cutting edge inclined relative to its lower surface.
Figure 21:
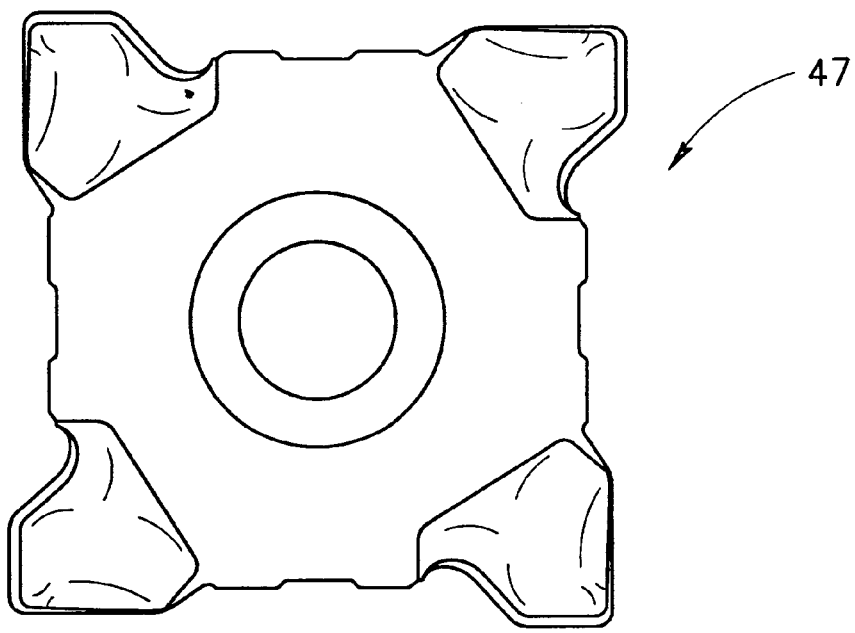
FIG. 21 is a top view of an alternative square shaped cutting insert.
Figure 22:
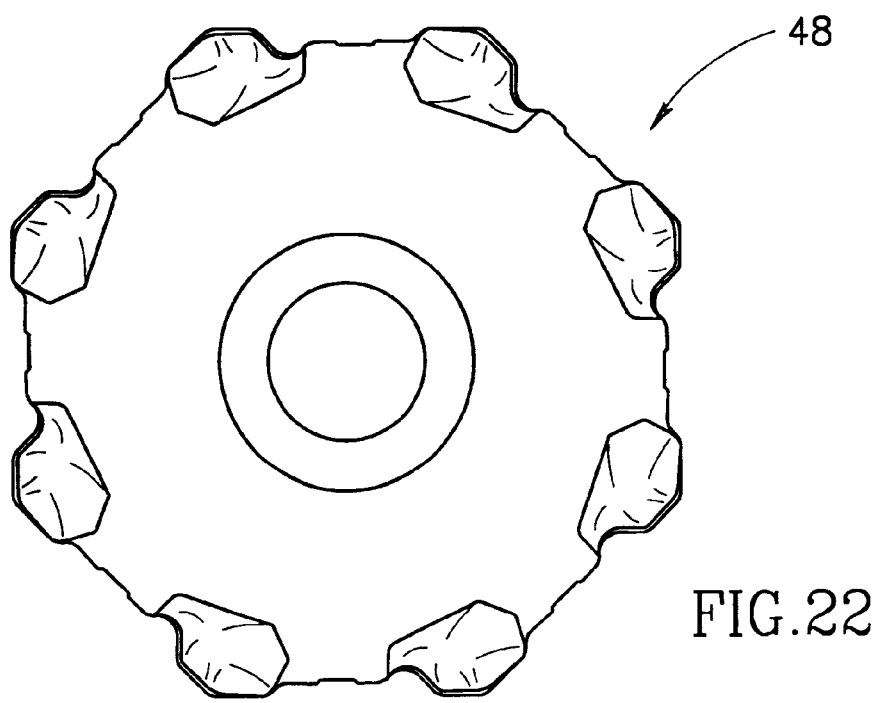
FIG. 22 is a top view of an octagon shaped cutting insert.

Turning now briefly to FIGS. 20–22, there are respectively shown an alternative cutting insert 1A having a front cutting edge 17A which is inclined relative to its lower surface 4 and two equilateral shaped cutting inserts having asymmetrical cutting corners, the cutting inserts being in the form of a square shaped cutting insert 47 and an octagon shaped cutting insert 48.

While the invention has been described with respect to a limited number of embodiments, it will be appreciated that many variations, modifications and other applications of the invention can be made.

We claim:

1. A milling cutting insert comprising a substantially prismatic body portion having an upper surface, a lower surface, side surfaces and at least one protruding nose-like cutting corner having a rake surface merging with said upper surface and a wraparound relief flank surface having portions merging respectively with adjacent side surfaces meeting at said cutting corner and protruding outwardly therefrom, front and side cutting edges formed by the intersection between said rake surface and said wraparound relief flank surface, said cutting edges protruding outwardly relative to their respective side surfaces and adjacent insert side edges defined by the intersection of said upper surface and said side surfaces, said cutting edges being elevated relative to said upper surface with at least said side cutting edge sloping towards said lower surface.

2. An insert according to claim 1 wherein the cutting insert has a substantially rectangular shape in a top view and includes a pair of indexable diagonally opposite cutting corners each having a front cutting edge along a long side surface of the cutting insert and a side cutting edge along a short side surface so as to subtend a rightangle with its adjacent front cutting edge.

3. An insert according to claim 2 wherein each long side surface is formed with a pair of spaced apart, co-planar abutment surfaces and each front cutting edge is parallel to said pair of co-planar abutment surfaces along its opposing long side surface.

4. An insert according to claim 3 wherein each of said pair of abutment surfaces are perpendicular to said lower surface and each short side surface is formed with a single planar abutment surface perpendicular to said lower surface.

5. An insert according to claim 4 wherein one of said pair of abutment surfaces of each long side surface is located opposite said front cutting edge of its opposing long side surface and the other of its said pair of abutment surfaces is adjacent its associated said cutting corner.

6. An insert according to claim 5 wherein said abutment surface of each short side surface is located opposite said side cutting edge of its opposing short side surface.

7. An insert according to any one of claims 1–6 wherein said front cutting edge is parallel to said lower surface.

8. An insert according to any one of claims 1–6 wherein said front cutting edge is inclined relative to said lower surface.

9. An insert according to claim 1 wherein the cutting insert has a substantially square shape in a top view and includes four indexable symmetrical cutting corners each having first and second cutting edges including first adjacent cutting edge components having an included angle of slightly greater than 90° there between and second cutting edge components having an included angle of slightly less than 180° relative to their respective adjacent first cutting edge components.

10. An insert according to claim 9 wherein each side surface is provided with a pair of spaced apart, co-planar abutment surfaces.

11. An insert according to claim 10 wherein said pairs of abutment surfaces are inclined relative to said lower surface.

12. A milling cutting insert comprising a substantially prismatic body portion having an upper surface, a lower surface, side surfaces and at least one protruding nose-like cutting corner having a rake surface merging with said upper surface and a wraparound relief flank surface having portions merging respectively with adjacent side surfaces meeting at said cutting corner, front and side cutting edges formed by the intersection between said rake surface and said wraparound relief flank surface, said cutting edges protruding outwardly relative to their respective side surfaces and being elevated relative to said upper surface with at least said side cutting edge sloping towards said lower surface, wherein the cutting insert has a substantially square shape in a top view and includes four indexable symmetrical cutting corners each having first and second cutting edges including first adjacent cutting edge components subtending an included angle of slightly greater than 90° therebetween and second cutting edge components subtending an included angle of slightly less than 180° relative to their respective adjacent first cutting edge components.

13. An insert according to claim 12, wherein each side surface is provided with a pair of spaced apart, co-planar abutment surfaces.

14. An insert according to claim 13, wherein said pairs of abutment surfaces are inclined relative to said lower surface.

15. A milling cutting insert comprising a substantially prismatic body portion having an upper surface, a lower surface, side surfaces and at least one protruding nose-like cutting corner, said cutting corner having:

a rake surface merging with said upper surface;

relief flank surface portions which merge with respective adjacent side surfaces and protrude outwardly with respect to said respective adjacent side surfaces;

front and side cutting edges formed by the intersection between said rake surface and said relief flank surface portions, said cutting edges protruding outwardly relative to their respective side surfaces and also relative to adjacent insert side edges defined by an intersection of said upper surface and said side surfaces, said cutting edges being elevated relative to said upper surface with at least said side cutting edge sloping towards said lower surface.

* * * * *